(12) United States Patent
Walsh et al.

(10) Patent No.: US 9,195,996 B1
(45) Date of Patent: Nov. 24, 2015

(54) SYSTEM AND METHOD FOR CLASSIFICATION OF COMMUNICATION SESSIONS IN A SOCIAL NETWORK

(75) Inventors: Richard Walsh, Raleigh, NC (US); Christopher Amidon, Apex, NC (US); Alfredo Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2700 days.

(21) Appl. No.: 11/645,854

(22) Filed: Dec. 27, 2006

(51) Int. Cl.
| G06F 17/30 | (2006.01) |
| G06F 15/18 | (2006.01) |
| G06F 15/16 | (2006.01) |
| G06F 7/00  | (2006.01) |
| G06Q 30/02 | (2012.01) |
| H04L 12/58 | (2006.01) |

(52) U.S. Cl.
CPC .......... *G06Q 30/0269* (2013.01); *H04L 12/588* (2013.01)

(58) Field of Classification Search
CPC ... G06Q 30/0269; H04L 67/306; H04L 67/22
USPC .......................................... 709/217; 707/737
See application file for complete search history.

(56) References Cited

U.S. PATENT DOCUMENTS

| 5,220,657 A | 6/1993 | Bly et al. |
| 5,517,617 A | 5/1996 | Sathaye et al. |
| 5,537,586 A | 7/1996 | Amram et al. |
| 5,717,923 A | 2/1998 | Dedrick |
| 5,749,081 A | 5/1998 | Whiteis |
| 5,867,799 A | 2/1999 | Lang et al. |
| 5,884,035 A | 3/1999 | Butman et al. |
| 5,948,040 A | 9/1999 | DeLorme et al. |
| 5,983,214 A | 11/1999 | Lang et al. |
| 6,073,119 A | 6/2000 | Bornemisza-Wahr et al. |
| 6,073,138 A | 6/2000 | de l'Etraz et al. |
| 6,088,702 A | 7/2000 | Plantz et al. |

(Continued)

FOREIGN PATENT DOCUMENTS

| EP | 1177056 | 7/2001 |
| EP | 1 338 966 A3 | 8/2003 |

(Continued)

OTHER PUBLICATIONS

No Author, "pidgin," (website), obtained Jul. 13, 2007, 1 page, http://pidgin.im/.

(Continued)

*Primary Examiner* — Phuoc Nguyen
*Assistant Examiner* — Kishin G Belani
(74) *Attorney, Agent, or Firm* — Withrow & Terranova, PLLC

(57) ABSTRACT

A system and method for generating a profile of communication sessions involves generating ratings for a selected set of messages and metadata associated with content items that are shared by social network users participating in a communication session. Ratings may be based on keyword scores which may then be adjusted based on user participation parameters, social network characterization parameters, and user selected options. Communication session profiles change over time and so recomputation is effected on periodic or scheduled bases. Generated profiles may be stored, frequently retrieved, or used in applications such as but not limited to content filtering, recommending content shared by participating social network members, selecting relevant advertisements, providing topic suggestions or user list invitations.

3 Claims, 5 Drawing Sheets

(56) References Cited

U.S. PATENT DOCUMENTS

| | | | |
|---|---|---|---|
| 6,092,049 A | 7/2000 | Chislenko et al. | |
| 6,195,696 B1 | 2/2001 | Baber et al. | |
| 6,260,069 B1 | 7/2001 | Anglin | |
| 6,301,609 B1 | 10/2001 | Aravamudan et al. | |
| 6,308,175 B1 | 10/2001 | Lang et al. | |
| 6,327,590 B1 | 12/2001 | Chidlovskii et al. | |
| 6,338,086 B1 | 1/2002 | Curtis et al. | |
| 6,374,290 B1 | 4/2002 | Scharber et al. | |
| 6,385,619 B1 | 5/2002 | Eichstaedt et al. | |
| 6,421,439 B1 | 7/2002 | Liffick | |
| 6,438,579 B1 | 8/2002 | Hosken | |
| 6,442,693 B1 | 8/2002 | Sandgren et al. | |
| 6,480,885 B1 | 11/2002 | Olivier | |
| 6,493,703 B1 | 12/2002 | Knight et al. | |
| 6,519,629 B2 | 2/2003 | Harvey et al. | |
| 6,525,747 B1 | 2/2003 | Bezos | |
| 6,526,411 B1 | 2/2003 | Ward | |
| 6,539,375 B2 | 3/2003 | Kawasaki | |
| 6,553,108 B1 | 4/2003 | Felger | |
| 6,594,693 B1 | 7/2003 | Borwankar | |
| 6,606,644 B1 | 8/2003 | Ford et al. | |
| 6,630,944 B1 | 10/2003 | Kakota et al. | |
| 6,651,086 B1 | 11/2003 | Manber et al. | |
| 6,654,735 B1 | 11/2003 | Eichstaedt et al. | |
| 6,745,178 B1 | 6/2004 | Emens et al. | |
| 6,748,420 B1 | 6/2004 | Quatrano et al. | |
| 6,757,517 B2 | 6/2004 | Chang | |
| 6,816,906 B1 | 11/2004 | Icken et al. | |
| 6,829,569 B1 | 12/2004 | Drucker et al. | |
| 6,832,245 B1 | 12/2004 | Isaacs et al. | |
| 6,839,680 B1 | 1/2005 | Liu et al. | |
| 6,859,807 B1 | 2/2005 | Knight et al. | |
| 6,970,444 B2 | 11/2005 | Chwieseni et al. | |
| 6,988,096 B2 | 1/2006 | Gupta et al. | |
| 6,988,127 B2 | 1/2006 | Matsuda et al. | |
| 6,993,564 B2 | 1/2006 | Whitten, II | |
| 7,006,999 B1 | 2/2006 | Huberman et al. | |
| 7,016,307 B2 | 3/2006 | Vasudev et al. | |
| 7,039,639 B2 | 5/2006 | Brezin et al. | |
| 7,058,897 B2 | 6/2006 | Matsuda | |
| 7,069,308 B2 | 6/2006 | Abrams | |
| 7,069,318 B2 | 6/2006 | Burbeck et al. | |
| 7,092,952 B1 | 8/2006 | Wilens | |
| 7,103,634 B1 | 9/2006 | Ullmann et al. | |
| 7,107,317 B2 | 9/2006 | Demsky et al. | |
| 7,117,254 B2 | 10/2006 | Lunt et al. | |
| 7,124,164 B1 | 10/2006 | Chemtob | |
| 7,142,856 B2 | 11/2006 | Barrow | |
| 7,188,140 B1 | 3/2007 | Greenspan et al. | |
| RE39,717 E | 7/2007 | Yates et al. | |
| 7,328,242 B1 | 2/2008 | McCarthy et al. | |
| 7,337,213 B2 | 2/2008 | Gusler et al. | |
| 7,359,894 B1 | 4/2008 | Liebman et al. | |
| 7,689,556 B2 * | 3/2010 | Garg et al. | 707/765 |
| 7,693,901 B2 | 4/2010 | Ka et al. | |
| 7,698,301 B2 * | 4/2010 | Lourdeaux | 707/999.107 |
| 7,720,916 B2 * | 5/2010 | Fisher et al. | 709/206 |
| 2002/0032634 A1 | 3/2002 | Abrams et al. | |
| 2002/0052885 A1 | 5/2002 | Levy | |
| 2002/0057284 A1 | 5/2002 | Dalby et al. | |
| 2002/0091556 A1 | 7/2002 | Fiala et al. | |
| 2002/0091667 A1 | 7/2002 | Jaipuria et al. | |
| 2002/0091975 A1 | 7/2002 | Redlich et al. | |
| 2002/0107721 A1 | 8/2002 | Darwent et al. | |
| 2002/0116466 A1 | 8/2002 | Trevithick et al. | |
| 2002/0124053 A1 | 9/2002 | Adams et al. | |
| 2002/0169737 A1 | 11/2002 | Armstrong et al. | |
| 2002/0178164 A1 | 11/2002 | Wisniewski et al. | |
| 2003/0014482 A1 | 1/2003 | Toyota et al. | |
| 2003/0028596 A1 | 2/2003 | Toyota et al. | |
| 2003/0050976 A1 | 3/2003 | Block et al. | |
| 2003/0050977 A1 | 3/2003 | Puthenkulam et al. | |
| 2003/0055892 A1 | 3/2003 | Huitema et al. | |
| 2003/0101449 A1 | 5/2003 | Bentolila et al. | |
| 2003/0135576 A1 | 7/2003 | Bodin | |
| 2003/0167324 A1 | 9/2003 | Farnham et al. | |
| 2003/0171941 A1 | 9/2003 | Kraenzel et al. | |
| 2003/0182421 A1 | 9/2003 | Faybishenko et al. | |
| 2003/0185421 A1 | 10/2003 | Okamoto et al. | |
| 2003/0200190 A1 | 10/2003 | Adar et al. | |
| 2003/0212680 A1 * | 11/2003 | Bates et al. | 707/7 |
| 2003/0220975 A1 | 11/2003 | Malik | |
| 2003/0220980 A1 | 11/2003 | Crane | |
| 2003/0234859 A1 | 12/2003 | Malzbender et al. | |
| 2004/0003090 A1 | 1/2004 | Deeds | |
| 2004/0015553 A1 | 1/2004 | Griffin et al. | |
| 2004/0019846 A1 | 1/2004 | Castellani et al. | |
| 2004/0024719 A1 * | 2/2004 | Adar et al. | 706/12 |
| 2004/0024892 A1 | 2/2004 | Creswell et al. | |
| 2004/0031058 A1 | 2/2004 | Reisman | |
| 2004/0032393 A1 | 2/2004 | Brandenberg et al. | |
| 2004/0044727 A1 | 3/2004 | Abdelaziz et al. | |
| 2004/0044774 A1 | 3/2004 | Mangalik et al. | |
| 2004/0059705 A1 | 3/2004 | Wittke et al. | |
| 2004/0088325 A1 | 5/2004 | Elder et al. | |
| 2004/0122696 A1 | 6/2004 | Beringer | |
| 2004/0122803 A1 | 6/2004 | Dom et al. | |
| 2004/0122822 A1 | 6/2004 | Thompson et al. | |
| 2004/0122855 A1 | 6/2004 | Ruvolo et al. | |
| 2004/0137882 A1 | 7/2004 | Forsyth | |
| 2004/0148275 A1 | 7/2004 | Achliopias | |
| 2004/0148503 A1 | 7/2004 | Sidman | |
| 2004/0162871 A1 | 8/2004 | Pabla et al. | |
| 2004/0205358 A1 | 10/2004 | Erickson | |
| 2004/0215793 A1 | 10/2004 | Ryan et al. | |
| 2004/0237045 A1 | 11/2004 | Meltzer | |
| 2004/0249768 A1 | 12/2004 | Kontio et al. | |
| 2004/0267625 A1 | 12/2004 | Feng et al. | |
| 2005/0015357 A1 | 1/2005 | Shahidi | |
| 2005/0031096 A1 | 2/2005 | Postrel | |
| 2005/0044361 A1 | 2/2005 | Chang et al. | |
| 2005/0052998 A1 | 3/2005 | Oliver et al. | |
| 2005/0076365 A1 | 4/2005 | Popov et al. | |
| 2005/0080655 A1 | 4/2005 | Sengir et al. | |
| 2005/0086300 A1 | 4/2005 | Yeager et al. | |
| 2005/0091289 A1 | 4/2005 | Shappell et al. | |
| 2005/0091316 A1 | 4/2005 | Ponce et al. | |
| 2005/0094313 A1 | 5/2005 | Kim | |
| 2005/0097170 A1 | 5/2005 | Zhu et al. | |
| 2005/0097320 A1 | 5/2005 | Golan et al. | |
| 2005/0114783 A1 | 5/2005 | Szeto | |
| 2005/0131762 A1 | 6/2005 | Bharat et al. | |
| 2005/0138430 A1 | 6/2005 | Landsman | |
| 2005/0149621 A1 | 7/2005 | Kirkland et al. | |
| 2005/0159970 A1 | 7/2005 | Buyukkokten et al. | |
| 2005/0165715 A1 | 7/2005 | Farnham et al. | |
| 2005/0165726 A1 | 7/2005 | Kawell, Jr. et al. | |
| 2005/0171799 A1 | 8/2005 | Hull et al. | |
| 2005/0171832 A1 | 8/2005 | Hull et al. | |
| 2005/0171954 A1 | 8/2005 | Hull et al. | |
| 2005/0171955 A1 | 8/2005 | Hull et al. | |
| 2005/0172001 A1 | 8/2005 | Zaner et al. | |
| 2005/0172116 A1 | 8/2005 | Burch et al. | |
| 2005/0177385 A1 | 8/2005 | Hull et al. | |
| 2005/0177614 A1 | 8/2005 | Bourne | |
| 2005/0197846 A1 | 9/2005 | Pezaris et al. | |
| 2005/0198031 A1 | 9/2005 | Pezaris et al. | |
| 2005/0198131 A1 | 9/2005 | Appelman et al. | |
| 2005/0198172 A1 | 9/2005 | Appelman et al. | |
| 2005/0198305 A1 | 9/2005 | Pezaris et al. | |
| 2005/0201290 A1 | 9/2005 | Vasudev et al. | |
| 2005/0203801 A1 | 9/2005 | Morgenstern et al. | |
| 2005/0203892 A1 | 9/2005 | Wesley et al. | |
| 2005/0207545 A1 | 9/2005 | Gao et al. | |
| 2005/0209999 A1 | 9/2005 | Jou | |
| 2005/0210104 A1 | 9/2005 | Torvinen | |
| 2005/0210387 A1 | 9/2005 | Alagappan et al. | |
| 2005/0210409 A1 | 9/2005 | Jou | |
| 2005/0215660 A1 | 9/2005 | Tomikawa et al. | |
| 2005/0216300 A1 | 9/2005 | Appelman et al. | |
| 2005/0216550 A1 | 9/2005 | Paseman et al. | |
| 2005/0226511 A1 | 10/2005 | Short | |
| 2005/0232423 A1 | 10/2005 | Horvitz et al. | |
| 2005/0234864 A1 | 10/2005 | Shapiro | |

(56) References Cited

U.S. PATENT DOCUMENTS

| | | |
|---|---|---|
| 2005/0235062 A1 | 10/2005 | Lunt et al. |
| 2005/0243736 A1 | 11/2005 | Faloutsos et al. |
| 2005/0246420 A1 | 11/2005 | Little |
| 2005/0251553 A1 | 11/2005 | Gottfried |
| 2005/0256756 A1 | 11/2005 | Lam et al. |
| 2005/0256866 A1 | 11/2005 | Lu et al. |
| 2005/0256909 A1 | 11/2005 | Aboulhosn et al. |
| 2005/0262199 A1 | 11/2005 | Chen et al. |
| 2005/0262530 A1 | 11/2005 | Roetschi et al. |
| 2005/0266835 A1 | 12/2005 | Agrawal et al. |
| 2005/0267766 A1 | 12/2005 | Galbreath et al. |
| 2005/0267940 A1 | 12/2005 | Galbreath et al. |
| 2005/0268329 A1 | 12/2005 | Lee et al. |
| 2005/0283497 A1 | 12/2005 | Nurminen et al. |
| 2006/0004703 A1 | 1/2006 | Spivack et al. |
| 2006/0004789 A1 | 1/2006 | Lunt et al. |
| 2006/0004892 A1 | 1/2006 | Lunt et al. |
| 2006/0009994 A1 | 1/2006 | Hogg et al. |
| 2006/0015588 A1 | 1/2006 | Achlioptas et al. |
| 2006/0026235 A1 | 2/2006 | Schwarz et al. |
| 2006/0036641 A1 | 2/2006 | Brydon et al. |
| 2006/0036766 A1 | 2/2006 | Baupin et al. |
| 2006/0041543 A1 | 2/2006 | Achlioptas |
| 2006/0042483 A1 | 3/2006 | Work et al. |
| 2006/0048059 A1 | 3/2006 | Etkin |
| 2006/0053380 A1 | 3/2006 | Spataro et al. |
| 2006/0058025 A1 | 3/2006 | Barrow |
| 2006/0063552 A1 | 3/2006 | Tillet et al. |
| 2006/0064431 A1 | 3/2006 | Kishore et al. |
| 2006/0074863 A1 | 4/2006 | Kishore et al. |
| 2006/0075039 A1 | 4/2006 | Narayanaswami et al. |
| 2006/0079260 A1 | 4/2006 | Tillet et al. |
| 2006/0080432 A1 | 4/2006 | Spataro et al. |
| 2006/0085248 A1 | 4/2006 | Arnett et al. |
| 2006/0085818 A1 | 4/2006 | Bodlaender et al. |
| 2006/0090137 A1 | 4/2006 | Cheng et al. |
| 2006/0095514 A1 | 5/2006 | Wang et al. |
| 2006/0095976 A1 | 5/2006 | Torres et al. |
| 2006/0112111 A1 | 5/2006 | Tseng et al. |
| 2006/0117264 A1 | 6/2006 | Beaton et al. |
| 2006/0117378 A1 | 6/2006 | Tam et al. |
| 2006/0121987 A1 | 6/2006 | Bortnik et al. |
| 2006/0121988 A1 | 6/2006 | Reville et al. |
| 2006/0123127 A1 | 6/2006 | Littlefield |
| 2006/0136419 A1 | 6/2006 | Brydon et al. |
| 2006/0143067 A1 | 6/2006 | Calabria |
| 2006/0143068 A1 | 6/2006 | Calabria |
| 2006/0143183 A1 | 6/2006 | Goldberg et al. |
| 2006/0143236 A1 | 6/2006 | Wu |
| 2006/0146765 A1 | 7/2006 | Van De Sluis et al. |
| 2006/0155813 A1 | 7/2006 | Dietz et al. |
| 2006/0161553 A1 | 7/2006 | Woo |
| 2006/0168022 A1 | 7/2006 | Levin et al. |
| 2006/0173838 A1 | 8/2006 | Garg et al. |
| 2006/0173957 A1 | 8/2006 | Robinson et al. |
| 2006/0173963 A1 | 8/2006 | Roseway et al. |
| 2006/0173985 A1 | 8/2006 | Moore |
| 2006/0184464 A1 | 8/2006 | Tseng et al. |
| 2006/0184997 A1 | 8/2006 | La Rotonda et al. |
| 2006/0190281 A1 | 8/2006 | Kott et al. |
| 2006/0190524 A1 | 8/2006 | Bethke et al. |
| 2006/0190536 A1 | 8/2006 | Strong et al. |
| 2006/0195441 A1 | 8/2006 | Julia et al. |
| 2006/0195462 A1 | 8/2006 | Rogers |
| 2006/0200434 A1 | 9/2006 | Flinn et al. |
| 2006/0200435 A1 | 9/2006 | Flinn et al. |
| 2006/0209727 A1 | 9/2006 | Jennings et al. |
| 2006/0209797 A1 | 9/2006 | Anisimov et al. |
| 2006/0218153 A1 | 9/2006 | Voon et al. |
| 2006/0218225 A1* | 9/2006 | Hee Voon et al. ............ 709/201 |
| 2006/0218286 A1 | 9/2006 | Brombal et al. |
| 2006/0218577 A1 | 9/2006 | Goodman et al. |
| 2006/0242581 A1 | 10/2006 | Manion et al. |
| 2006/0248458 A1* | 11/2006 | Li ............................... 715/700 |
| 2006/0248573 A1 | 11/2006 | Pannu et al. |
| 2006/0259982 A1 | 11/2006 | Upendran |
| 2006/0288041 A1 | 12/2006 | Plastina et al. |
| 2007/0028000 A1 | 2/2007 | Ebbesen et al. |
| 2007/0033263 A1 | 2/2007 | Goering et al. |
| 2007/0049335 A1 | 3/2007 | Haitani et al. |
| 2007/0106627 A1 | 5/2007 | Srivastava et al. |
| 2007/0156813 A1 | 7/2007 | Galvez et al. |
| 2007/0173325 A1 | 7/2007 | Shaw et al. |
| 2007/0179945 A1* | 8/2007 | Marston et al. ................ 707/5 |
| 2007/0192410 A1 | 8/2007 | Liversidge et al. |
| 2007/0192588 A1 | 8/2007 | Roskind et al. |
| 2007/0198506 A1 | 8/2007 | Attaran Rezaei et al. |
| 2007/0198648 A1 | 8/2007 | Allen et al. |
| 2007/0203828 A1 | 8/2007 | Jung et al. |
| 2007/0233828 A1 | 10/2007 | Gilbert |
| 2007/0244861 A1 | 10/2007 | Malandain et al. |
| 2007/0250641 A1 | 10/2007 | Flannery et al. |
| 2007/0266097 A1 | 11/2007 | Harik et al. |
| 2007/0282887 A1 | 12/2007 | Fischer et al. |
| 2008/0019353 A1 | 1/2008 | Foote |
| 2008/0040428 A1 | 2/2008 | Wei et al. |
| 2008/0046976 A1 | 2/2008 | Zuckerberg |
| 2008/0059992 A1 | 3/2008 | Amidon et al. |
| 2008/0065471 A1 | 3/2008 | Reynolds et al. |
| 2008/0086759 A1 | 4/2008 | Colson |
| 2008/0088698 A1 | 4/2008 | Patel et al. |
| 2008/0176646 A1 | 7/2008 | Kelly et al. |
| 2009/0030943 A1 | 1/2009 | Kall |

FOREIGN PATENT DOCUMENTS

| | | |
|---|---|---|
| EP | 1675060 | 6/2006 |
| WO | WO 2006036165 | 4/2006 |
| WO | WO 2006041425 | 4/2006 |

OTHER PUBLICATIONS

No Author, "Dijkstra's algorithm," (website), obtained Apr. 10, 2008, 4 pages, http://en.wikipedia.org/wiki/Dijkstra's_algorithm.

No Author, "News—Gaim 1.5.0," (website), obtained Sep. 6, 2007, 3 pages, http://www.gaim.sourceforge.net.

No Author, "The Friend of a Fried (FOAF) Project," (website), date unknown, 1 page, http://www.foaf-project.com.

No Author, "Huminity—Social Networking," (website), obtained Feb. 8, 2007, 1 page, http://www.huminity.com/english/software.html.

Warren Sack, "Discourse Diagrams: Interface Design for Very Large-Scale Conversations," (article), 2000, 10 pages.

Marc A. Smith et al., "Visualization Components for Persistent Conversations," (article), Sep. 2000, 8 pages.

No Author, "FOAF Vocabulary Specification," (website), obtained Feb. 20, 2007, 42 pages, http://xmlns.com/foaf/0.1/.

Home page for www.myspace.com (accessed Jul. 13, 2007)—1 page.

Home page for www.facebook.com (accessed Jul. 13, 2007)—1 page.

Homepage for www.friendster.com (accessed Jul. 13, 2007)—1 page.

Definition of Centrality as per Wikipedia (accessed Sep. 13, 2007).

Definition of Eigenvector Centrality as per Wikipedia (accessed Sep. 13, 2007).

"The Mathematics of Networks" by M.E.J. Neman, in *The New Palgrave Encyclopedia of Economics*, 2nd edition.

Kagal, L. et al., "Developing Secure Agent Systems Using Delegation Based Trust Management," Jul. 16, 2002, 8 pages.

No Author, "Semantic Web Trust and Security Resource Guide," accessed Aug. 7, 2007, http://sites.wiwiss.fu-berlin.de/suhl/bizer/SWTSGuide/, 13 pages.

Golbeck, J., "Papers and Talks—Trust in Web-based Social Networks," accessed Aug. 7, 2007, http://trust.mindswap.org/papers.shtml, 9 pages.

Vitiello, Jr., E., "trust—A module for defining trust relationships in FOAF," Jul. 22, 2002, updated Nov. 19, 2002, http://www.perceive.net/schemas/20021119/trust/default.htm, 2 pages.

* cited by examiner

Social Network

SYSTEM AND METHOD FOR CLASSIFICATION OF COMMUNICATION SESSIONS IN A SOCIAL NETWORK

FIELD OF THE INVENTION

The present invention relates generally to automatic classification of communication sessions (e.g., a messaging conference) of social network users based on data describing parameters such as participating users, conversation messages and shared content items within a communication session.

BACKGROUND OF THE INVENTION

The increased availability of network-capable computing devices has led to a wide variety of communication options for users. Users can exchange messages and content through various communication systems including e-mail, instant messaging, chat rooms, bulletin and discussion boards, file sharing applications, and blogs and other web sites. For example, instant messaging systems such as Internet Relay Chat (IRC), ICQ, AOL Instant Messenger, Yahoo! Messenger, and Microsoft's MSN Messenger are widely used by many users on the Internet. Similar systems are available for messaging within local networks, as well.

Various arrangements of the previously-listed (and other) communication systems have been proposed for use in so-called "social networking" systems. Generally speaking, a "social network" refers to a group of persons or other entities ("members") linked to one another through one or more types of social connections. Social networks are also commonly referred to as "friend-of-a-friend" networks, although social networks may of course include or consist entirely of entities linked by social connections other than friendship. For example, a social network can include members linked to one another by connections including common friendship, place or field of employment, place of education, place of residence, membership in a club or other group, or common hobbies or topical interests. Many social networking systems attempt to provide computer-based tools for maintaining, enhancing, and creating social networks.

For example, social networking web sites provide users with web space to create a profile and link to various other users designated as "friends." See, for example, http://www-.myspace.com, http://www.facebook.com, and http://www-.friendster.com. Users of such sites can post messages and other content to web pages accessible to various parties of their choosing (for example, to "friends only" or to the public at large). Social networking sites may also utilize instant messaging and online chat rooms that allow for near-instantaneous communication between users. Social networks may also involve sharing of digital content, including photos, videos, audio files, documents, and other data items.

Social networks and other computer-based communication systems may provide various means for users to set up profiles. For example, a user may list interests and other attributes in a profile, with the profile used by other users for informational purposes and/or by one or more computer systems to provide functionality, such as recommendations and/or content delivery, for instance. However, users may provide inaccurate and/or incomplete profile information.

Other systems may be configured to generate additional profile information about user interactions. For example, U.S. Patent Application Publication 2006/0064431 (Kishore et al.) is concerned with generation of a knowledge interchange ("KI" profile) that identifies interests of a user, individuals with whom a user has communicated, and topics on which the communication with the user was made.

Many systems that have involved various profiling of users and/or associated communication-related aspects (such as web page or content viewing habits) create their characterizations based on prior information as opposed to real-time quantities that are continuously changing over time. Furthermore, specific parameters may be considered individually and/or in isolation. In light of the foregoing and other concerns, improved methods and systems for classifying communication sessions (i.e. actual live communication interaction between users in a social network) are provided.

BRIEF SUMMARY OF THE INVENTION

Objects and advantages of the present invention will be apparent to one of skill in the art upon review of the presently disclosed subject matter, and include providing improved methods and systems of classifying communication sessions among users in a social network.

In accordance with the presently disclosed technology, a social network communication session may correspond to the actual communication among a collection of at least some members of a social network that have previously been or are currently connected by way of one or more communication links for purposes of live communication, content distribution, or other purposes. In one embodiment, a social network communication session can be characterized by a "circuit" representing a collection of social network members who were/are participating in a live communication link, such as an ongoing instant messaging conversation between multiple parties. Other exemplary social network sessions are defined by the user interaction associated with specific occurrences of one or more file or content sharing sessions, e-mail conversations, blog postings and comments, video and/or audio chat sessions, or other video, textual, and/or audio connections, including telephone connections, and the like.

In some exemplary embodiments, communication sessions are characterized by a plurality of different parameters, thus providing a comprehensive analysis of user communications. One parameter that is analyzed in accordance with the subject classification technology includes the underlying social network of users that have participated and/or or are participating in one or more communication sessions with one another. Additional analyzed parameters may selectively include a topic of conversation among linked users associated with a communication session, as well as metadata associated with digital assets or content that is shared among users in the social network. By providing data pertaining to conversation topics and shared content, creation of a communication classification is facilitated that provides a refined understanding of what is relevant to one or more given users. The subject classification system may be aware of what users are participating in a given topic and what digital content is shared and can adjust corresponding influence levels of such users relative to a given analyzed communication instance. For example, a user who chats more about a given topic or who shares more relevant content may have an increased influence level associated with their contributed parameters.

Further related advantages in accordance with aspects of the presently disclosed technology are realized by providing personalized classifications for each user (or various selected users) participating in a communication session based on their individual respective social network information. User participation, activity level, and shared content within a social network and specific communication sessions are analyzed in a perpetual fashion that accounts for changes over time. Still further, relevancy considerations that are determined by considering the contribution of a user's conversation and shared content help prevent the potential problem of parameter influence by spammers who would provide little to no relevant content or conversation in a communication session.

Exemplary embodiments related to computing a communication session profile involve generating ratings for a selected set of messages and metadata associated with content items that are shared by social network users participating in a communication session. Ratings may be based on keyword scores which may then be adjusted based on user participation parameters, social network characterization parameters, and user selected options. Communication session profiles change over time and so recomputation is effected on periodic or scheduled bases. Generated profiles may be stored, frequently retrieved, or used in applications such as but not limited to content filtering, recommending content shared by participating social network members, selecting relevant advertisements, providing topic suggestions or user list invitations.

BRIEF DESCRIPTION OF THE SEVERAL VIEWS OF THE DRAWINGS

A full and enabling disclosure including the best mode of practicing the appended claims and directed to one of ordinary skill in the art is set forth more particularly in the remainder of the specification. The specification makes reference to the appended Figures, in which:

Use of like reference numerals in different features is intended to illustrate like or analogous components.

DETAILED DESCRIPTION OF THE PREFERRED EMBODIMENTS

Figure 1:
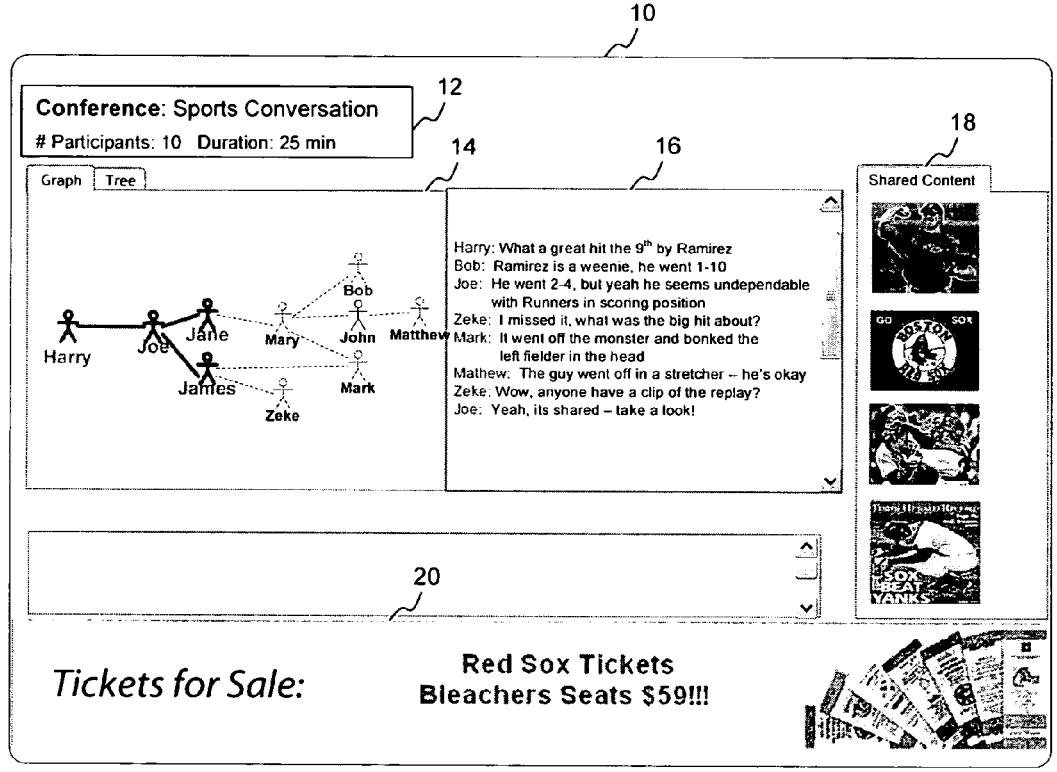
FIG. 1 is an exemplary user interface that may be viewed by users in a social network, wherein certain display portions may be customized based on one or more computed session profiles relative to each given user.

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The technology discussed herein makes reference to servers, databases, software applications, and other computer-based systems, as well as actions taken and information sent to and from such systems. One of ordinary skill in the art will recognize the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel. When data is obtained or accessed between a first and second computer system or component thereof, the actual data may travel between the systems directly or indirectly. For example, if a first computer accesses a file or data from a second computer, the access may involve one or more intermediary computers, proxies, and the like. The actual file or data may move between the computers, or one computer may provide a pointer or metafile that the second computer uses to access the actual data from a computer other than the first computer, for instance.

The various computer systems discussed herein are not limited to any particular hardware architecture or configuration. Any suitable programming, scripting, or other type of language or combinations of languages may be used to implement the teachings contained herein. Embodiments of the methods and systems set forth herein may be implemented by one or more general-purpose or customized computing devices accessing software instructions rendered in a computer-readable form. Embodiments of the methods and systems set forth herein may also be implemented by hard-wired logic or other circuitry, including, but not limited to application-specific circuits. Of course, combinations of computer-executed software and hard-wired logic may be suitable, as well.

Embodiments of the methods disclosed herein may be executed by one or more suitable computing devices. Such devices may access one or more computer-readable media that embody computer-readable instructions which, when executed by at least one computer, cause the at least one computer to implement one or more embodiments of the methods disclosed herein. Furthermore, components of the presently-disclosed technology, such as knowledge bases and data stores, may be implemented using one or more computer-readable media. Any suitable computer-readable medium or media may be used, including diskettes, drives, and other magnetic-based storage media, optical storage media, including disks (including CD-ROMS, DVD-ROMS, and variants thereof), flash, RAM, ROM, and other memory devices, and the like.

The present disclosure provides several examples of classifying users based on certain types of shared content and certain types of metadata, such as keywords. However, in other embodiments, any suitable type of metadata may be used, and any suitable type of content may be used in classifying users. Furthermore, the extent of the illustrated social networks, relationship types, and other social network characterizations are only for purposes of example; the present subject matter may utilize other types of social networks and social network data than illustrated herein.

Referring now to FIG. 1, an overview of aspects of a communication session and related applications in accordance with the presently disclosed technology will now be presented relative to an exemplary user interface 10. User interface 10 displays information about a communication session to a user, including general conference identifier(s) 12, a graphical social network representation 14 of participating users in the communication session, a conversation message display 16, a representation 18 of content items shared among the participating social network users; and an advertisement display 20.

As previously mentioned, a social network session corresponds to actual communication among a collection of at least some members of a social network that have previously been or are currently connected by way of one or more direct or indirect communication links for purposes of live communication, content distribution, or other purposes. The exemplary communication session of FIG. 1 and of other examples discussed herein are described with reference to an instant messaging (IM) conferencing session among social network users. It should be appreciated that the presently disclosed technology for computing communication session profiles is not limited to profiles in a conferencing context, but may be applied to other types of network-based interactions including but not limited to one or more file or content sharing sessions, e-mail conversations, blog postings and comments, video and/or audio chat sessions, Voice over Internet Protocol (VoIP) sessions or other video, textual, and/or audio connections, including telephone connections, and the like.

Referring still to FIG. 1, a graphical representation of the social network users who are participating in a given communication session is illustrated in the schematic "circuit" shown in display portion 14. The circuit in social network display portion 14 indicates that the user interface 10 is displayed to a given user Harry. Harry is communicating with another social network user Joe, who in turn is communicating with users Jane and James. Jane is linked to Mary, who is respectively linked to Bob, John and Mark. John is communicating with Matthew and James is communicating with Zeke and Mark. It should be appreciated that social network users who are not directly linked in the representation of FIG. 1 may still be in recent or current communication with one another. In the context of an IM conferencing session, the messages and content shared among all linked members (Harry, Joe, Jane, James, Mary, Zeke, Bob, John, Mark, Matthew) or a selected group(s) of such members may be viewable and accessible by all members. In some embodiments, although all members are connected in some fashion, the extent to which certain conversations, shared content, etc. are visible to a given participant (e.g., Harry) may be limited. For example, in one embodiment content may only be viewed or accessed by users within three levels or some other predetermined "distance" between users. It should be appreciated that although the exemplary social network members illustrated as participating in display portion 14 are indicated as individual users, social network users and session participants are not limited to individual entities and may correspond to business or organizational entities, servers, communication nodes, or the like and to a collection of multiple such entities. Furthermore, although the interaction of participating users may be illustrated in a schematic circuit graph as shown in FIG. 1, additional or alternative representations may be provided to a user via interface 10. Such representations may include but are not limited to different iconic displays, tree structure representations or textual descriptions of a social network session.

In the context of a social network conferencing session, a display portion 16 associated with Harry's user display provides a list of all conversation messages that are contributed by the participating social network users. Participating users may additionally or alternatively share particular content items, such as but not limited to digital assets such as photos, videos, images, text files, html documents, spreadsheets, or others. A display portion 18 represents to a user a group of content items that are shared by the participating social network users. In one embodiment, all content items available for sharing from various participating session members are provided (actually or by a viewable representation) to Harry. In another embodiment (as discussed later in more detail) the shared content display 18 as well as the advertisement display 20 are customized by the subject session profiling service to provide content and/or ads that are selected in some fashion based on a relevancy comparison of interaction parameters associated with the given session and possible content items or ads that may be provided. This specialized customization for a given user display will vary user to user depending on the session profile relative to each different user. Thus, available content and/or ads or other information may be particularly selected for each user participating in the social network communication session.

Figure 2:
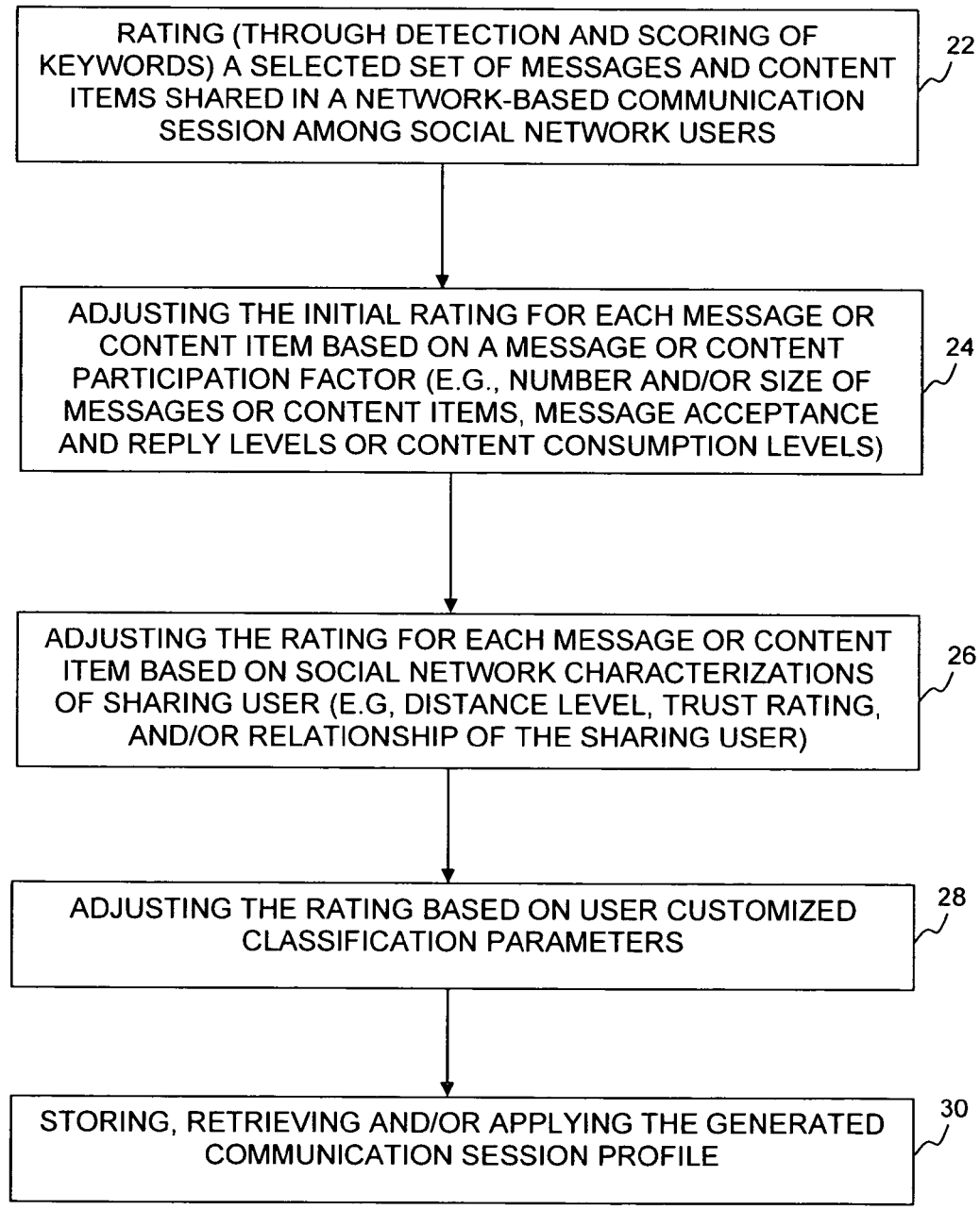
FIG. 2 is a block diagram of exemplary steps in a method of computing a communication session profile in accordance with aspects of the presently disclosed technology.

Referring now to FIG. 2, a description of exemplary steps in a method of computing a session profile will now be discussed. In general, a session profile represents a snapshot of the communication classification (e.g., a conferencing classification) at a given moment in time. The communication session (or conversation) profile computation generally involves a first series of steps that initially evaluate the conversation messages and content items shared during the session. A second series of steps involves adjusting the message and content item ratings based on various parameters such as user participation in a network and social network rating characteristics.

With more particular reference to FIG. 2, a first exemplary step 22 in a session profile computation process involves rating a selected set of messages and content items shared in a network-based communication conversation. Each message provided (such as those represented in display portion 16 of FIG. 1) typically comprises a set of words, phrases or similar symbolic representation whose text may be analyzed. In some embodiments, text may be analyzed after translation to text from another format. For example, in VoIP applications, voice data packets may first be translated into some alphanumeric textual representation that will then accommodate keyword detection and scoring in accordance with the presently disclosed technology. Similarly, each shared content item (such as those in display portion 18 of FIG. 1) has metadata that describes user and file history, content description and identifiers, source of sharing user, and the like. In one embodiment, such metadata may be considered distinctly separate from its corresponding digital content, but some digital content file types enable metadata to be stored within the content file. For example, the Joint Photographic Experts Group (JPEG) file format enables metadata such as keywords, annotations, resolution, size, camera settings, information describing the camera that captured the image, date and time of capture, location such as Global Positioning System (GPS) coordinates, and the like to be stored within the image file. The metadata may also include information describing the participating social network user sharing the particular content item. For example, if the participating user's system is a mobile telephone, the metadata may optionally include the make and model of the mobile telephone; hardware and software capabilities of the mobile telephone such as processor, storage, and memory capabilities; and the like.

Referring still to FIG. 2, keywords in conversation messages and content metadata may be detected and scored based on keyword frequency in the message. In one embodiment, text analyzers may be used for detection and/or scoring. In one embodiment, more sophisticated natural language analyzers may be used to detect important words, phrases, emotions, or other descriptive aspects of conversational interactions. The relative importance of such detected words, phrases, etc. may be factored into message and content item ratings by applying additional influence to such keywords.

Keywords can be generated in any suitable fashion. In some embodiments, keywords may be obtained directly from conversation messages or from metadata associated with a content item. For example, a digital photograph may be annotated by one or more tags, summaries, or other identifiers. Keywords may be generated based on the content metadata—for example, summaries, annotations, or even the content itself may be scanned or otherwise mined for keywords. In some embodiments, the system may support any combination of standard keywords and user-defined key words.

Once one or more keywords are generated, each keyword is then scored. One example of keyword scoring involves a direct correlation between the number of occurrences of each keyword in the message or in content item metadata and the score for that message/item. In another example, an initial score for a keyword may be defined in a lookup table or other resource. For example, the system may maintain an ontology of keywords and associated values. Several examples of scoring scenarios are discussed below wherein the initial or base keyword score is adjusted. However, still further types of scoring and combinations of scoring methodology are possible. More particular discussion of exemplary aspects associated with detecting and scoring keywords is disclosed in concurrently filed U.S. Patent Application entitled "SYSTEM AND METHOD FOR USER CLASSIFICATION BASED ON SOCIAL NETWORK AWARE CONTENT ANALYSIS" having application Ser. No. 11/645,864 filed Dec. 27, 2006 and issued as U.S. Pat. No. 8,135,800 on Mar. 13, 2012.

It should be appreciated that the keyword scores determined in the initial rating may be numeric values, but may also correspond to other appropriate descriptors that depict the relative nature of difference in keyword association and relevance for different messages or pieces of content.

After an initial rating is calculated for the selected set of messages and content items, additional adjustments can be made to the ratings to account for various parameters associated with the social network communication session, such as user participation and social network characterization. Exemplary step 24 in FIG. 2 concerns adjusting the rating for selected messages or content items based on user participation, and exemplary step 26 concerns adjusting ratings based on social network characterizations.

With more particular reference to exemplary step 24 of FIG. 2, the subject profile generation technology takes scores associated with each message and content item (based on the initial keyword rating process of step 22) and adjusts the rating accordingly based on a user participation modifier. In one embodiment, a user that participates more in a given communication session may have a stronger influence over the classification than users that contribute less to the session. Such influence may result, for example, in a general increase or decrease of initially determined ratings. Consider that a given message was provided by User A in a conferencing session. A detected keyword in the given message could have a keyword score of 200, but the message was provided from a user that did not participate in the session. The initial keyword score of 200 could then be adjusted downward to reflect this user participation characteristic. It may be adjusted downward by subtracting some numeric quantity of points (e.g., 50 points) or a particular percentage of the initial rating (e.g., 10%).

User participation in the subject rating adjustment step 24 of FIG. 2 may be gauged on a number of parameters associated with a given user, such as but not limited to the number and/or size of messages or content items, message acceptance levels, message reply levels, and content consumption levels. Some user participation factors may apply to messages while others apply to shared content, and still further user participation factors apply to both messages and content items.

With respect to message factors, message volume may be considered, which is a measure of how many messages a given user sent during the communication session. Additional message characterizations may include measurements of the number of non-stop words, number of unique words, number of predetermined buzzwords, and other factors. Message acceptance considerations factor in the amount of replies given to particular messages sent by a user, or subsequent discussions relating the message provided by a given user. In another example, user participation adjustments may increase the rating of messages or content for a user that initiates or starts a given communication session. Still further message acceptance considerations include the number of users ignoring a user, the number of users that opt to ignore a message, the frequency of message contribution, and other related factors.

With respect to content item factors, a given user's contribution of content to the communication session can be considered. The total amount of content can be considered based on the number of content items contributed by a user as well as the size of the contributed items. The subject profiling system may also factor in the number of users in a conference that consumed a shared content item. Consumption generally refers to whether or not a user viewed or accessed a portion or the entirety of a given content item. In general, the profiling system applies more weight to metadata of contributed content that is actually consumed by one or more participating users (e.g., a video that was actually watched). Still further content considerations may relate to activities that may have occurred while consuming the content (e.g., number of rewinds, pauses, fast-forwards, mutes, and other actions).

Additional user participation adjustments for both messages and content may relate to the scope of initial distribution of such messages and/or content items. For example, messages and/or content items may be distributed to different numbers of members including but not limited to: only one user in the social network, a handful of users, or all users. This scope of distribution for messages and/or content items may correlate to an adjustment factor for such items. For instance, it may be desirable to increase keyword scores for messages and/or content items that have been distributed to a greater number of users. Alternatively, keyword scores for messages and/or content with a lesser scope of distribution may be weighed more heavily. In other embodiments, increases or decreases in keyword scores may be implemented for multiple different predetermined ranges of distribution.

Still further user participation adjustments may be afforded based on user customization of received messages or content items. A client application associated with a given user may be incorporated as part of a user interface and allows users to provide direct feedback of messages and/or content. For example, a user can select a message or piece of content and can rate it on a scale from 1-5 (or by selection from some other predetermined rating definitions). This user feedback rating can also be used to modify or scale the initial rating associated with a given message or content item.

By considering aspects of user participation that relate to various user replies to given messages or to content consumption rates of shared content, the subject session profile methodology helps limit the influence of possible spammers or other unauthorized or unwanted participants in a social network session since participating users will typically not respond to spammer messages or content provided by spammers. Additionally or alternatively, other users in the network may assign a relatively low rating to messages or content items received from spammers (e.g., such as a rating described above on a scale from 1-5 or other scale definition), thus also limiting the influence of contributions from such entities.

Referring still to FIG. 2, discussion will now be directed to exemplary step 26 of adjusting a message or content item rating based on social network characterizations. More particularly, the subject session profiling system personalizes analysis for each user in a session based on their social network information. The previously scored keywords (which may already be adjusted according to user participation factors) are weighed by factoring in additional aspects related to the source of the keywords and the current user.

For example, more influence may be given to selected users that are closer in the social network to a given user by weighing keywords derived from messages and/or content associated with such closer users more heavily. For example, a keyword score may be multiplied by an adjustment factor that is inversely proportional to social network distance. The social network distance may be obtained, for example, by a session profile service (e.g., profile service 48 of FIG. 5) sending a query to one or more social network services (such as component 46 of FIG. 5). Such a social network service 46 may provide a measure of distance such as degrees of separation, levels, or other indicia. Profile generation service 48 may include additional data in the query or queries in some embodiments. For example, session profile service 48 may provide parameters such as path selection criteria that may provide how the distance calculation is to proceed, for example, by providing rules for resolving cases in which multiple paths between users result in multiple distance measurements.

As another example, keywords may be scored based on the degree of trust between the target user and the selected user. For instance, messages and/or content associated with highly-trusted users may have high influence, while messages and/or content associated with less-trusted users has little to no influence. Trust may also be determined based on querying social network service 46 to determine if the users have provided data indicating trust. For instance, some social network systems provide for users to rate one another in terms of trust. If the target user has provided a trust rating for the selected user, the trust rating or a derivative thereof may be used to scale points while scoring keywords derived from messages or content associated with the selected user. For example, in a system in which trust is rated on a scale of 1 to 10 (10 being highest), a target user's rating of "7" for the selected user can result in the selected user's keyword scores being multiplied by seven.

However, trust ratings may not be available in all circumstances—for instance, the user classification system may rely on messages and/or content from a selected user who has not been rated by the target user in terms of trust. The scoring process may utilize trust ratings of the selected user by one or more users other than the target user, with the ratings of the other user(s) scaled based on distance of each other user to the target user. For example, assume that a selected user has not been rated in terms of trust by a target user. However, the selected user may have been rated a "5" by a second user. If the second user is two levels away from the target user, the second user's rating of "5" may be divided by the distance (two in this example) to infer a trust rating of "2.5" for the selected user.

Alternatively, when a trust level is unavailable, one or more other resources may be consulted, such as a trust assessment system. Exemplary trust assessment systems are described in Walsh, et al., U.S. patent application Ser. No. 11/636,910, entitled "System and Method for Social Network Trust Assessment", filed Dec. 11, 2006 and assigned to Qurio Holdings, Inc.

In some embodiments, thresholding may be applied to trust levels as part of the scoring process. For example, only trust levels above a defined threshold value may be used to adjust points for a selected user. As another example, ranges of trust levels may be defined wherein a certain multiplier is used for any trust level falling within specified ranges. Furthermore, trust ratings may result in lowering the score of a keyword or set of keywords. For example, if a target user rates a selected user below a certain level or with a negative rating, the points contributed by that user may be multiplied by a negative factor. These notions of thresholds and range-based adjustments may be applied to trust ratings but also to user participation modifiers or social network descriptors and corresponding scoring adjustments as previously described.

A further example of scoring adjusts keyword points based on relationship types. For example, social network service 46 may provide definitions of different types of relationships, including, but not limited to: friend, co-worker, family, club/organization member, and acquaintance. Different relationship types between the target user and the selected user may result in different scaling of points for keywords derived from messages and/or content items associated with the selected user. For example, family relationships may be given a multiplier of "5", friend relationships a multiplier of "4", club/organization relationships a multiplier of "3", and so on. In some embodiments, multiple relationship types may be involved—for example, a target user may be linked to a selected user by a path including one or more intermediate users. The classification system may factor in the distance along the path, for instance, by using a multiplier such as (relationship type modifier)/distance. In other embodiments, the type designators provided by users other than the target user may be ignored, or may result in a different scaling factor.

Another possible parameter for adjusting keyword points relates to the geographic origins of users and/or the messages and content items associated with such users. Such parameter may be especially applicable when users communicate via systems outfitted with location-based services, such as GPS-enabled mobile devices or other devices or systems, or when user client systems are linked directly or indirectly to systems that are enabled with location-based services such as but not limited to wireless access points or the like that are aware of their relative geographic location. Metadata associated with access points, communication links or distributed messages or content can include geographical identifiers. This enables keyword scores associated with a given message or content item to be adjusted based on the geographic location of its contributing user. For example, keyword scores may be increased or decreased for messages and content items received from users within certain predefined geographic areas (e.g., a 100-mile radius, a given quadrant area, a given state, county, city or other defined boundary area or areas). For example, in one embodiment keyword scores may be increased for messages and content received from users that are geographically closer to a target user. In other embodiments, keyword scores may be increased for messages and content received from less proximate users. It should also be appreciated that multiple different geographic areas may be defined to correspond to different possible multipliers. For example, messages and content associated with users in the same state as the target user (e.g., North Carolina) may be assigned a multiplier of "5"; if the messages and/or content are received from a user outside of NC but within the United States, a rating of "4" is assigned, if received from outside the U.S. a rating of "3" is used, etc. In other example, users within a 100-mile radius receive one rating, users within a 500-mile radius receive another rating, users within a 1000-mile radius receive a still further rating. Other variations of single or multiple mappings of geographic areas to scoring adjustment factors may be practiced in accordance with the disclosed technology.

Another example of scoring adjusts keyword points based on considering the selected user's role or participation in the social network. For example, social network data may be used to determine various measures of a selected user's centrality to or connectedness in a social network. For example, centrality may be determined using principles of graph theory and network analysis. For example, eigenvector centrality may be used as part of determining centrality of a user. Keywords from highly-connected users may be scored differently than keywords from less-connected users. For example, in a given social network, some users may be highly connected, such as by having multiple links throughout the network. Other users may have only a few links. Adjustment factors may be used to change the relative contribution of such users—for instance, in some embodiments, it may be advantageous to weigh the highly-connected users less heavily than the users with lower connectivity in order to gain a more balanced view of the social network. In other embodiments, contributed messages and/or content from less-connected users may be weighed more heavily. The specific mapping of user connectivity levels to the weight of messages or content received from a user can be defined in a variety of different fashions as desired, and should not be construed as a limitation of the presently disclosed technology.

In another example of scoring, the system adjusts keyword points based on considering the selected user's length of participation in the social network. For example, keywords derived from messages and/or content associated with a selected user with greater longevity in a social network may be given greater weight than keywords derived from content associated with a newly-joined member. For instance, a keyword's score may be multiplied by a duration adjustment such as (days in social network/365). As another alternative, participation length may be used as a threshold: a selected user's messages and/or content will contribute keyword points only if the selected user has been participating in the social network for a long enough time. As a still further alternative, the system may select a multiplier based on a duration range. For example, points from selected users with duration less than 14 days may be given a multiplier of "0.5"; points from selected users with a duration of 14-60 days may be given a multiplier of "1.0"; while points from selected user with a duration of 60 days or more may be given a multiplier of "2." Of course, combinations of set points, thresholds, and multipliers derived from duration are possible.

Figure 3A:
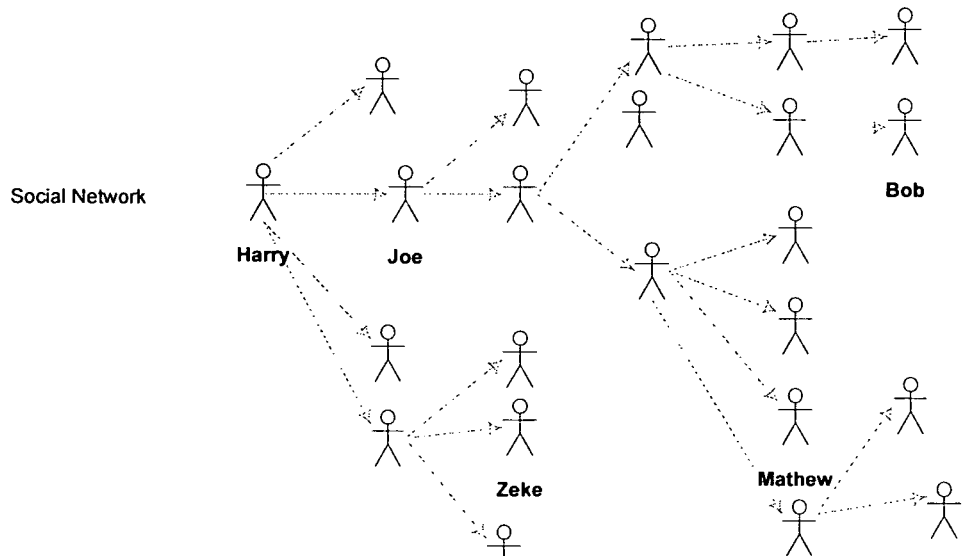
FIG. 3a provides a schematic illustration of an exemplary social network.

Alternatively, the session profiling system may use circuit information to override the social network information. In this instance, a social network "circuit" is a subset of users in a larger social network that is representative of particular interactions. For example, FIG. 3a depicts a social network schematic representation including a plurality of users. It may be useful to represent a specific subset of the users (represented by the circuit schematic of FIG. 3b) in order to enhance user functionalities. In accordance with the exemplary circuit of FIG. 3b including a select group of users from the social network of FIG. 3a, namely Harry, Joe, Zeke, Matthew and Bob, such users are represented in a new relationship. For instance, Harry and Zeke are two levels between them in FIG. 3a, but only one level in FIG. 3b. Similarly, Harry and Matthew are separated by four levels in FIG. 3a, but only by two levels in FIG. 3b. The ultimate distance levels in the circuit representation of FIG. 3b instead of the social network levels of FIG. 3a may be used in one embodiment to facilitate adjustment of message or content keyword scores based on the characterization of circuit user levels instead of social network user levels. Additional details on how to create a circuit such as that of FIG. 3b from a social network such as illustrated in FIG. 3a are provided in currently pending co-owned U.S. patent application Ser. No. 11/526,955 entitled "Systems and Methods for Discovering, Creating and Managing Social Network Circuits", filed on Sep. 26, 2006, which is incorporated by reference herein in its entirety for all purposes.

Referring again to FIG. 2, an additional step 28 in a process for computing session profiles includes a step of adjusting message and content item ratings based on classification parameters that are customized by a user. More particularly, users may have their own preferences to configure profile generation based on what that particular user deems is important. For example, a user may equally value the input of family, friends, and club associations. Therefore, the subject session profiling technology may enable a user to control the evaluation through preference settings. The user can configure settings such as time or distance limits for selecting which messages or content items to evaluate in the profiling process. Also, trust ranges and relationship type multipliers can be defined by a user for use in the steps of adjusting ratings based on user participation or social network characterizations. Additionally, users may copy and share given preference settings defined for one or more users to other users in their social network. In one embodiment, a user may select these customization features through a user interface similar to that illustrated in FIG. 1.

Figure 4:
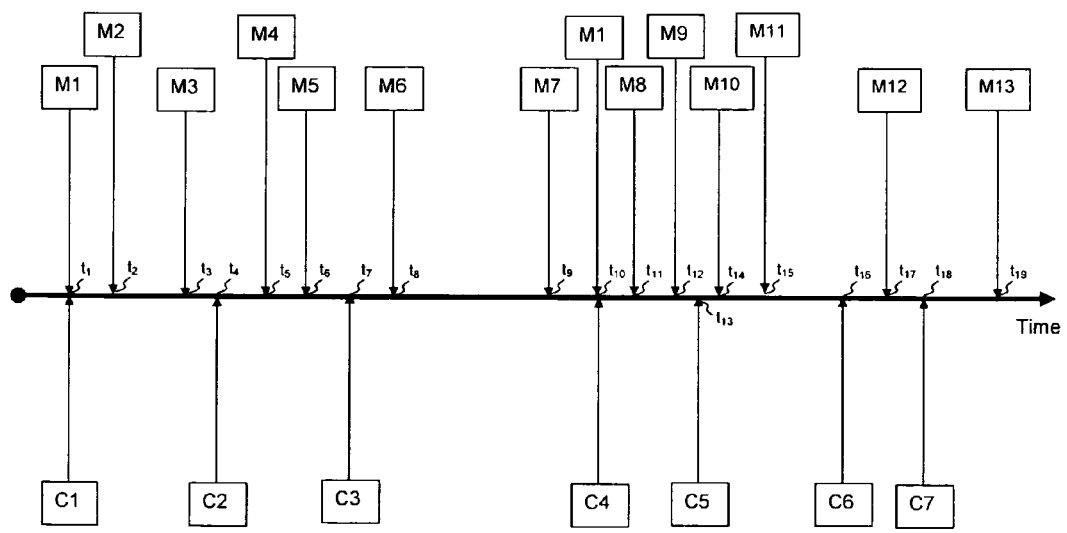
FIG. 4 is a graphical representation over time depicting when multiple messages and content items may be provided and shared during a network-based communication session.

In accordance with steps 22-28, respectively, of FIG. 2, an ultimate session profile may include a plurality of adjusted ratings for each message and/or content item in a selected group. The group of rated messages and content items may include all messages and content items shared during a session or only a subset of such messages. For instance consider the timeline representation of FIG. 4. In FIG. 4, newly added messages are represented by blocks M1, M2, . . . , M13 and newly shared content items are represented by blocks C1, C2, . . . , C7. It may be desirable in some embodiments to rate only messages and content items shared in a more recent time span since that data may often be more relevant in providing a real-time session snapshot (i.e., a profile). For example, the profiling process may be defined to rate all messages in FIG. 4 or alternatively only the more recently provided messages and content from time $t_{10}$ on, or some other time-defined window (e.g., the last two hours). The option of analyzing only a subset of more recent data may be particularly useful in a very active conference in which computation costs could be high. In another embodiment, all messages and content items are analyzed, but more recent ones are afforded a higher rating.

This aggregation of information collectively represents the session profile snapshot at a given instance in time. Once the profile is generated, additional steps may occur as indicated in step 30. For instance, the profile may be stored in a profile database located at the user's client system or at a server (as will be discussed further in more detail). Profiles may be stored in a database with all or only a portion of the data used to produce the profile (e.g., message and content identifications, keywords and scores, initial ratings, adjustment factors, etc.). As one option, the session profiling system may store profile differences relative to prior versions rather than complete profiles to take advantage of the nature of conversations evolving over time. Since not every aspect of the conversation, shared content items and participating users will change every time a new session profile is computed, it may be less efficient to resave all such information. Storing differences may also enable a client application to provide users with the ability to time-shift to a previous time in a given session. This feature may be particularly useful to users that join a conversation after it has already begun. The time shifted user can retrieve and utilize the session profile associated at that particular point in time.

Another application of the generated session profiles is to recommend content items for sharing with a given user. The profiling system may compare available content items (e.g., all content items made available for sharing by users participating in a social network communication session) and select a subset of the available items based on which ones have the highest adjusted rating obtained after performing the steps disclosed herein. This subset of recommended content may be provided to a user in the content display portion 18 in the user interface 10 of FIG. 1. Advertisements may also be selected by comparison of available ads to the session profile and provided to a user in the advertisement display portion 20 of user interface 10. A still further application relates to content filtering where a given user's social network system screens proposed content for sharing by another user based on the session profile. Only content items that are relevant to keywords or user preferences deemed significant in the session profile will ultimately be provided to a user. New or supplemental conversation topics can also be recommended to participating social network users. Still further additional users may be recommended to a client based on their potential interests relative to the session profile. A list of recommended users may be provided to a given user in one embodiment. In another embodiment, the profiling system can automatically send out invitations to such potential users.

It should be appreciated in accordance with the subject session profiling technology that it is preferred to obtain multiple session profiles in a real-time fashion such that profile characterizations can be periodically updated. In one embodiment, profile computation may be defined to occur in increments of a given time duration, for example, once every 5 seconds, once every minute, hour, or other user-selected, system-selected or default defined time period. In another embodiment, the scheduling of session profile computations may depend on a recomputation rate that considers users and/or conference characteristics. For example, a popular conference having a relatively large number of users and amount of messages or shared content may have its conference profile recomputed more frequently than smaller conferences with less activity. Alternatively, the profiling system may favor certain users or conversation topics and so will recompute profiles more often for premium users or more relevant topics.

Figure 5:
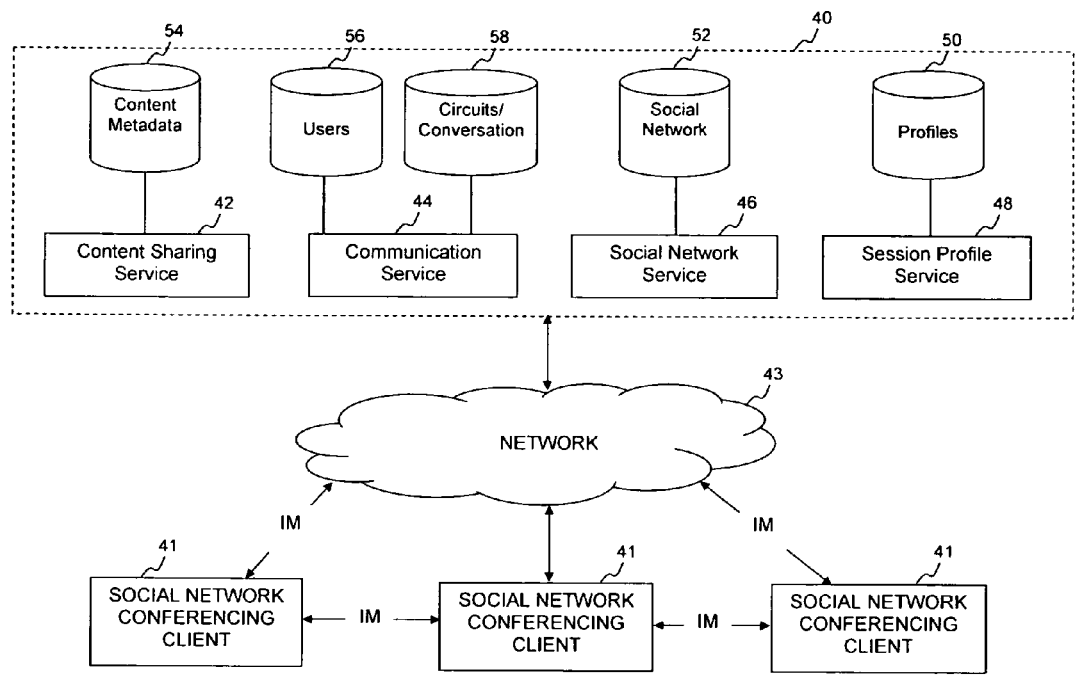
FIG. 5 is a block diagram illustrating exemplary components in an exemplary communication session classification system.

Referring now to FIG. 5, additional entities and associated hardware and software components that may be involved in the subject session profiling system will now be discussed. Participating users in a social network are depicted as social network conferencing clients 41. These client users 41 may generally correspond to the users Harry, Joe, Jane, James, etc. in FIG. 1. Their social network communication session (e.g., an instant messaging conference) may occur over a network 43, such as the Internet. It should be appreciated that such network communications may also occur over alternative networks such as a dial-in network, a local area network (LAN), wide area network (WAN), public switched telephone network (PSTN), the Internet, intranet or Ethernet type networks and others over any combination of hard-wired or wireless communication links.

The network 43 may also be coupled to a server 40, which may host one or more services such as but not limited to a content sharing service 42, a communication service 44, a social network service 46, and a session profile service 48. Session profile service 48 performs the profile functionality discussed in the present disclosure, and generally utilizes information that is obtained from the other services 42, 44 and 46. It should be appreciated that although the profiling functionality is illustrated as occurring in a server 40 separate from each client 41, the presently disclosed profiling methodology may alternatively be performed by a profile application provided at each client 41. In some embodiments, the profiling functionality may be shared between client and server nodes.

Referring still to FIG. 5, session profile service 48 (and other services 42, 44 and 46) may be respectively implemented by a dedicated server or any suitable number of physical and/or logical units. Session profile service 48 is capable of accessing profile store 50, which comprises any suitable arrangement of storage components, such as one or more databases maintained in a computer-readable medium. Store 50 includes data defining one or more of the generated session profiles.

Session profile service 48 is in communication with one or more social network systems 46, one or more content sharing systems 42, and one or more communication systems 44. Social network system 46 may include one or more systems providing social network functionality. For example, a social network system may include a plurality of servers, databases, and other components that allow users to define user profiles, characterize relationships, and interact with one another (such as via instant messaging, web pages, blog posts, etc.). Data representing the social network structures, member relationships, and other data defining the social network is maintained by store 52. Each social network system 46 may be implemented in a number of different ways, and so store 52 is meant to generally represent the various databases, mappings, and/or other representations of social networks. Social network system 46 may represent any suitable type of system providing social network functionality. The underlying social networks may be static in nature, such as friend-of-a-friend networks, but alternatively or additionally may be dynamic, such as social networks based on ongoing communications activity. Social network system 46 may interact with various social network members not actually participating in a given social network communication session.

Referring still to FIG. 5, a content sharing service 42 may comprise a peer-to-peer (P2P) file sharing system, a hybrid P2P system, a central server based system or the like that allows various clients to share digital files such as photographs, audio files, and/or video files with one another. In some embodiments, content sharing service 42 may be social-network-aware, such as a system that allows for controlled viral distribution of content based on social network considerations such as distance between an originating user and a receiving user. In other embodiments, content sharing service 42 may comprise a distribution system utilizing one or more centralized servers for distribution to content sharing clients (not shown in FIG. 5).

Content sharing system 42 has access to content sharing metadata 54. For instance, content sharing metadata 54 may comprise content sharing system metadata indicating distribution histories, user preferences, and other information about the flow of content to clients in a content sharing system 42. As was noted above with regard to social network systems, multiple content sharing systems may be utilized in the present subject matter.

Figure 3B:
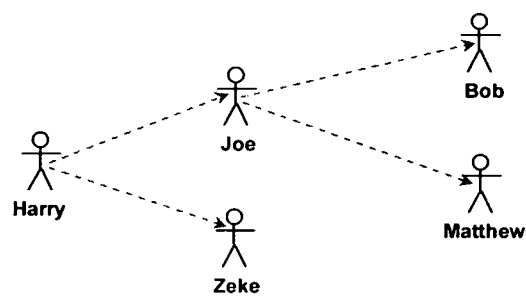
FIG. 3b provides a schematic illustration of an alternative exemplary social network formed by user selection or system computation from the social network represented in FIG. 3a and based on aspects of a given communication session.

Referring still to FIG. 5, a communication system 44 may comprise a service that tracks various users and their live communication interactions. Such communication interactions may occur via one or more different types of communication such as but not limited to instant messaging, file or content sharing sessions, e-mail conversations, blog postings and comments, video and/or audio chat sessions, Voice over Internet Protocol (VoIP) sessions or other video, textual, and/or audio connections, including telephone connections, and the like. More particularly, a first store of communicating users 56 includes a collection of social network clients that have participated in or are participating in a given communication session. Data store 58 includes a collection of the actual circuits or conversations. Circuits may correspond to a representation of communicating users, such as shown in FIG. 3b. Users in an active social network circuit may comprise all of the users in a potential social network circuit of a subset of users in a potential social network.

In some embodiments, some or all of the components illustrated in FIG. 5 may be combined. For example, session profile service 48 may be included as part of a social network system. Furthermore, the social network system may also provide content sharing functionality. As was noted above, some content sharing systems are social-network-aware; in some cases, the content sharing system, communication system and social networking system may be combined or interoperate independently of the session profile generation server(s) 48. Similarly, each of the data stores may comprise multiple physical or logical units and/or may be combined with one another.

It is appreciated by persons skilled in the art that what has been particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed:

1. A computer implemented method for characterizing a communication session comprising:
   receiving messages and content items sent during a communication session between a first user and a second user in a social network;
   analyzing keywords associated with the messages and metadata associated with the content items to determine an initial rating of the received messages and content items;
   adjusting the initial rating based on:
   a contribution level of the first user in the communication session;
   a consumption level of the content items;
   an amount of time the first user has participated in the social network; and
   a number of users that consumed at least a portion of a content item contributed by one of the first or second users;
   characterizing the communication session based on the adjusted initial rating.

2. A computer implemented method for characterizing a communication session comprising:
   receiving messages and content items sent during a communication session between a first user and a second user in a social network;
   analyzing keywords associated with the messages and metadata associated with the content items to determine an initial rating of the received messages and content items;
   adjusting the initial rating based on:
   a contribution level of the first user in the communication session;
   a consumption level of the content items, wherein the consumption level is based on a number of users separate from the first user and the second user who have consumed the content items; and
   an amount of time the first user has participated in the social network;
   characterizing the communication session based on the adjusted initial rating.

3. A computer implemented method for characterizing a communication session comprising:
   receiving messages and content items sent during a communication session between a first user and a second user in a social network;
   analyzing keywords associated with the messages and metadata associated with the content items;
   determining frequency of occurrence of both the keywords and the metadata associated with the content items, where analyzing the keywords and the metadata and determining the frequency of occurrence of both the keywords and the metadata are used to determine an initial rating of the received messages and content items;
   adjusting the initial rating based on:
   a contribution level of the first user in the communication session;
   a consumption level of the content items by third party users, where greater consumption of the content items increases the initial rating and lower consumption of the content decreases the initial rating;
   an amount of time the first user has participated in the social network;
   a participation factor of either the first user or the second user who contributed the messages or content items where the participation factor is calculated based on the number of messages sent by either the first user or the second user;
   a social network distance between the first user and the second user; and
   characterizing the communication session based on the adjusted initial rating.

* * * * *